May 8, 1934.  L. P. CAMPBELL  1,957,757
MOWING MACHINE
Filed Jan. 6, 1933
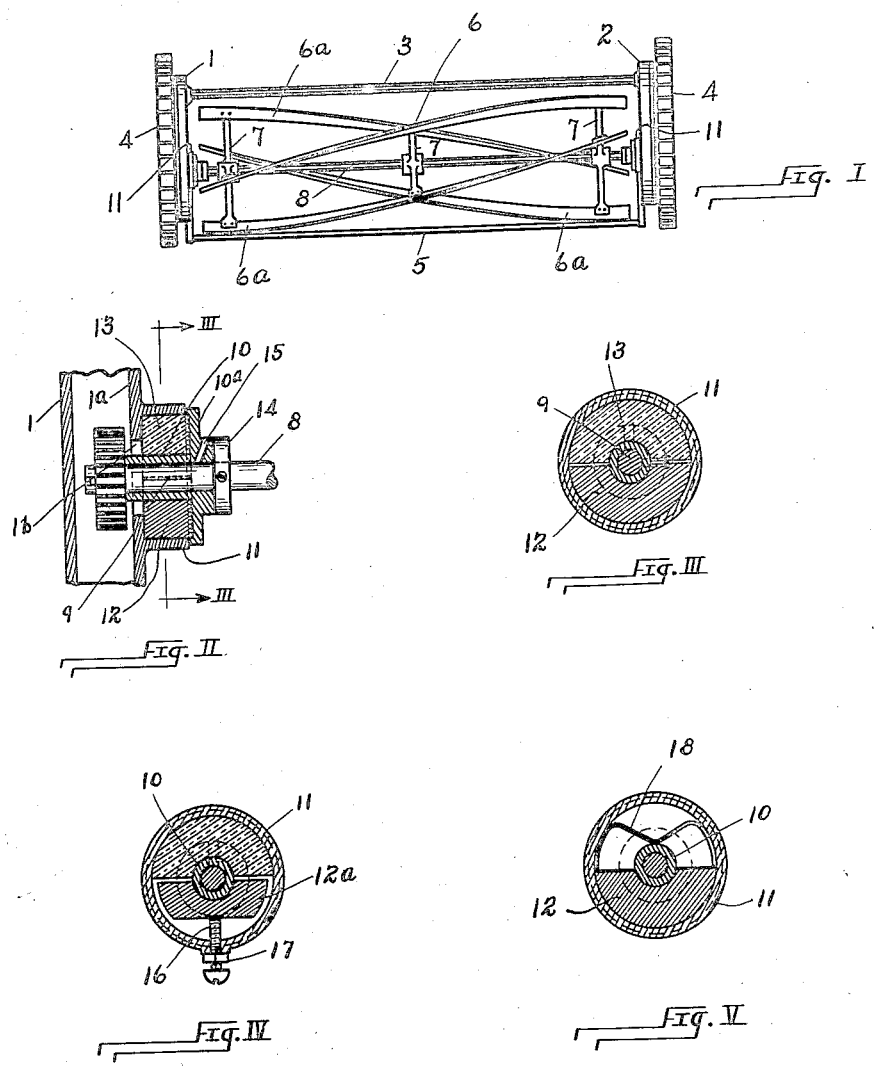
INVENTOR
Lawrence P. Campbell
by Christy Christy and Wharton
his attorneys Patented May 8, 1934

1,957,757

UNITED STATES PATENT OFFICE 1,957,757

MOWING MACHINE

Lawrence P. Campbell, Sharpsburg, Pa.

Application January 6, 1933, Serial No. 650,477

4 Claims. (Cl. 56—304)

My invention relates to a mowing machine; a machine, that is to say, including a revoluble cutter-reel whose blades cooperate with a cutter-bar, to cut grass, grain stalks, or similar things projecting above the ground over which the machine is propelled.

In the accompanying drawing Fig. I is a view in front elevation of a mowing machine in which the invention is embodied; Fig. II is a fragmentary view of the journal at one end of the cutter-reel of the machine, and shows a sectional view (on a vertical plane coincident with the axis of the journal) of the bearing and adjacent frame portions of the machine; Fig. III is a sectional view of the bearing, taken on the plane III—III of Fig. II; and Figs. IV and V are views in section, comparable to the view of Fig. III, and showing each a modification in the structure of my invention.

The invention in this case is embodied in a lawn-mower of conventional type. The lawn-mower comprises two side frame elements 1 and 2, which are rigidly united in spaced relation by means of one or more cross members 3. Traction wheels 4 are mounted on each of the side frame elements 1, 2, and the usual trailing roller (not shown) co-operates with the wheels, so that the machine is adapted to travel over the ground. Extending between the side frame elements 1, 2 is a cutter-bar 5; the cutter-bar is in the usual manner adjustably secured to the frame elements 1, 2; a cutter-reel 6 is trunnioned at its opposite ends in the frame elements 1, 2; the reel 6 is of well-known structure, and is so organized with the cutter-bar 5 that, as the reel rotates, its blades 6a sweep successively over the cutting edge of the cutter-bar, and shear the grass projecting from the ground over which the mower is propelled. According to usual practice, the cutter-reel may be geared to the traction wheels 4, so that the travel of the machine, in causing rotation of the traction wheels, effects an accompanying rotation of the cutter-reel.

To the end that the machine shall mow effectively and smoothly, it is essential that each blade 6a of the reel shall progressively make contact with the cutter-bar throughout its cutting sweep. As may be observed in Fig. I, the blades 6a are secured by means of radial brackets 7 to the shaft 8 of the reel; the blades are helically disposed with respect to the shaft 8, and are so organized with respect to one another that as one blade, during the rotation of the reel, is completing its sweep across the cutter-bar the next succeeding blade of the reel is advancing into position of contact with the cutter-bar. Accordingly, it will be understood (assuming that the reel and cutter-bar are rigidly mounted) that, unless the cutting edges of the blades 6a are at all points in their extents located at the same radial distance from the shaft 8, there will be some intervals (during the rotation of the reel) in which the cutter-blades will fail to make proper contact with the cutter-bar, whereby the mowing effect of the machine will not be uniform. Experience has shown that a reel, which is fixed in relation to its cooperating cutter-bar—a reel whose cutter-blades are mounted in fixed relation to the axis of the reel, cannot, without practically constant repair and attention on the part of an attendant, be so adjusted as to insure constant or uniform contact between the cutter-blades and the cutter-bar. To correct this condition, I provide automatically adjustable bearings for the opposite journals of the cutter-reel. Yielding means are associated with the bearings, tending to urge the reel toward the cutter-bar, and to insure the desired contact between the cutter-bar and the blades of the revolving reel. This broad idea has been tried by others before me, but to the best of my knowledge all prior apparatus (intended to achieve the desired result) have been bulky, heavy, costly, subject to accumulations of dust and dirt, and have been subject to such other objections as have prevented the art from employing them to advantage. The object of my invention is to provide a particularly effective yielding bearing for the opposite journals of the cutter-reel—a yielding bearing which is economical to construct—a yielding bearing which is completely enclosed and protected from dirt—a yielding bearing which requires a minimum of space for its installation—and a yielding bearing which, although enclosed, is readily accessible for adjustment and lubrication.

A bearing embodying the invention is associated with each of the opposite journals of the cutter-reel 6, and in Fig. II the left-hand end (Fig. I) of the cutter-reel is shown in detail and to larger scale. Each terminal region of the reel shaft 8 constitutes a journal 9. A bearing—in this case a sleeve bearing 10—is installed upon the journal 9; a journal housing 11 is formed upon the side frame element (1) of the machine, and conveniently the journal housing is cylindrical in form; the journal housing 11 may advantageously be constructed integrally with the wall 1a of the side frame, and the bearing 10 extends into the journal housing, as shown in Fig. II. An orifice 1b is provided in the wall of the side frame, to permit the terminal of the journal 9 to extend into the usual gear chamber formed in the side frame. In accordance with the invention the orifice 1b is of substantially larger diameter than the journal and its bearing, to the end that within practical limits the shaft 8 is free (except for means presently to be described) to move radially of the journal housing 11.

In the housing 11 a rigid, stationary support is provided beneath the journal 9, and a yielding or resilient support is provided (in the housing) above the bearing and journal. Advantageously, the rigid bearing comprises a semicircular block 12 of metal for supporting the bearing 10 from beneath. The block 12 (conveniently) is independently formed and machined and then assembled in the housing 11, although I contemplate that the block 12 may be cast or forged integrally with the housing and then machined. Co-operating with the rigid, metal block 12 is a resilient segmental block 13, located within the housing 11, to support the bearing and journal from above. The block 13, advantageously, is a block of rubber which, under the reaction of the blades 6a of the reel in moving into contact with and sweeping over the cutter-bar 5, yields as the need arises and permits the bearing and journal (9, 10) to shift upward.

The journals at both ends of the shaft 8 are provided in this manner with yielding bearings, and thus, the cutter-reel 6 is adapted automatically to adjust itself in relation to the cutter-bar 6. The rubber blocks 13 at each end of the shaft 8 admit of a slight tilting of the reel from end to end, and this feature is important in the maintenance of the desired relation between the reel 6 and the cutter-bar 5. It will be understood that the initial mechanical adjustment of the cutter-bar 5 with respect to the reel 6 is such that the rubber blocks press downward upon the bearings 10 at the opposite ends of shaft 3, and yieldingly maintain the cutter-blades 6a in contact with the cutter-bar at all points through their sweep over the cutter-bar.

It is important to note that the whole of my special bearing assembly requires a minimum of space and is located within a small housing 11. Conveniently, the bearing 10 includes a flange 10a which co-operates with the wall 1a of the side frame in laterally securing the blocks 12, 13 in position in the housing 11. A keeper ring 14 is fixed upon the shaft 8, to secure the bearing 10 in desired position upon such shaft. It is further important to note that the bearing and its co-operating blocks 12, 13 are substantially enclosed or housed in my structure, and that a lubricant passage 15 communicates with the journal 9, and precludes the incharged lubricant from the rubber block 13.

Fig. IV shows that the rigid block may advantageously be adjustable within the housing 11. I provide an adjustment device which comprises a screw 16 projecting into the housing 11, and extending in threaded engagement with the wall of such housing. The screw bears at its inner end against the block 12a, and determines the elevation of the block in the housing 11; the screw 16 is accessible externally of the housing for adjustment, and a nut 17 is adapted to lock the screw in position of adjustment. Thus the "dead" position of the journal 9, and the compression force of the rubber block 13 upon the bearing, may be regulated.

Fig. V illustrates that a spring 18 may be organized within the housing 11, to function in place of the rubber block 13.

I claim as my invention:

1. In a mower comprising two side frames, two traction wheels, and a cutter-bar, the combination of a cutter-reel revolubly mounted in and extending between said side frames and adapted to cooperate with said cutter-bar, a bearing on each of the opposite ends of the axis of said reel, a journal housing integrated with each of said side frames, said housings severally encompassing said bearings and projecting from the respective side frames toward the vertical mid-plane of the mower structure, means located in said housings for the rigid support of said bearings from beneath, resilient means in said housings, effective in each between the top wall of the housing and the bearing, for yieldingly supporting such bearings from above, and a flange or collar integrated with each bearing and serving as a closure for the open end of the associated journal housing.

2. In a mower comprising two side frames, two traction wheels and a cutter-bar, the combination of a cutter-reel revolubly mounted in and extending between said side frames and adapted to cooperate with said cutter-bar, a bearing on each of the opposite ends of the axis of said reel, a journal housing integrated with one of said side frames, said housing encompassing one of said bearings and projecting from the side frame toward the vertical mid-plane of the mower structure, means located in said housing for the rigid support of said bearing from beneath, resilient means in said housing, effective between the bearing and the top wall of the housing, for yieldingly supporting such bearing from above, and means for closing the end of said housing and enclosing said bearing structure.

3. In a mower comprising two side frames, two traction wheels and a cutter-bar, the combination of a cutter-reel revolubly mounted in and extending between said side frames and adapted to cooperate with said cutter-bar, a bearing on each of the opposite ends of the axis of said reel, a journal housing integrated with one of said side frames, said housing encompassing one of said bearings and projecting from the side frame toward the vertical mid-plane of the mower structure, means located in said housing for the rigid support of said bearing from beneath, a block of rubber secured between the wall of said housing and the top of said bearing for yieldingly supporting such bearing from above, and means for closing the end of said housing and thereby enclosing said bearing structure.

4. In a mower comprising two side frames, two traction wheels, and a cutter-bar, the combination of a cutter-reel revolubly mounted in and extending between said side frames and adapted to cooperate with said cutter bar, a bearing on each of the opposite ends of the axis of said reel, a journal housing integrated with each of said side frames, said housing severally encompassing said bearings and projecting from the respective side frames toward the vertical mid-plane of the mower structure, means located in said housings for the rigid support of said bearings from beneath, a rubber block enclosed in each of said housings, and secured between the wall of the housing and the top of the bearing therein, whereby said bearings are yieldingly supported from above and said reel is automatically adjustable in its engagement with said cutter-bar, and a flange or collar integrated with each bearing and serving as a closure for the open end of the associated journal housing.

LAWRENCE P. CAMPBELL.